Figure 1:
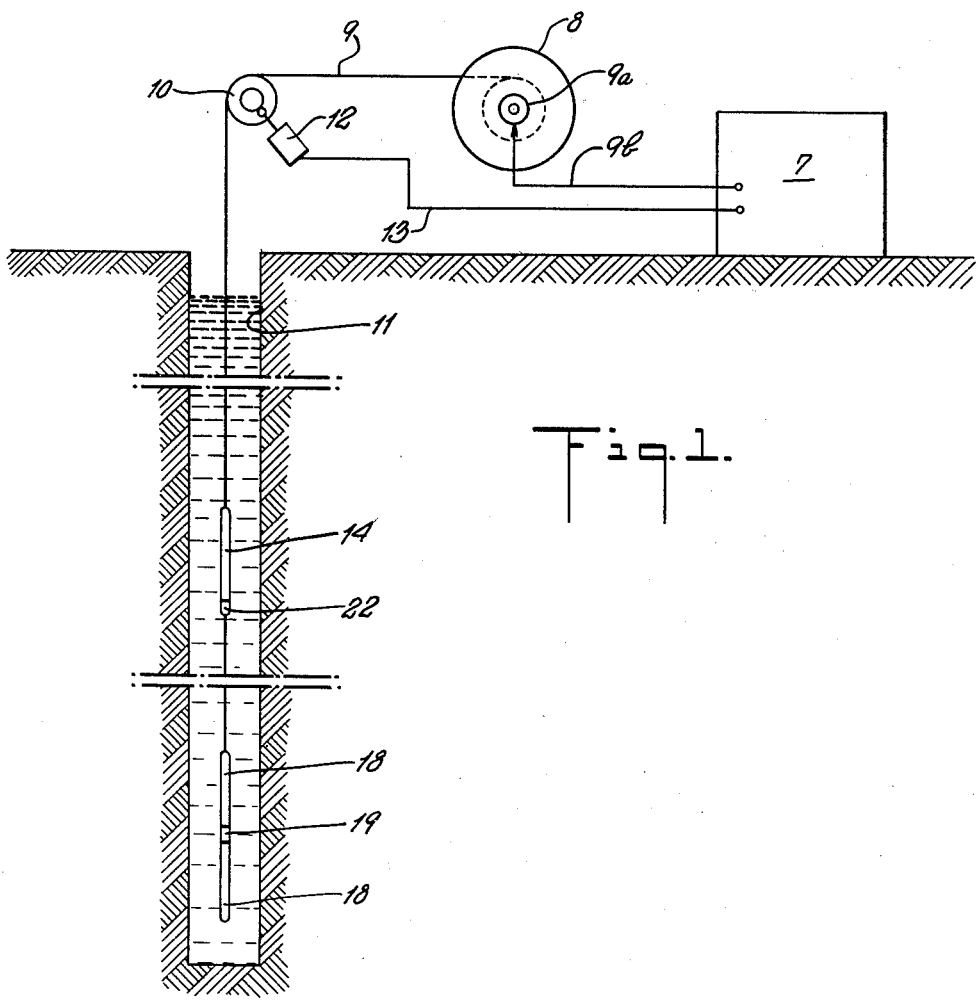

INVENTOR.
John E. Owen
BY
Kenyon & Kenyon
ATTORNEYS

May 3, 1955 J. E. OWEN 2,707,768
GEOPHYSICAL EXPLORATION BY ELECTRICAL WELL LOGGING
Filed July 2, 1948 3 Sheets-Sheet 2

United States Patent Office

2,707,768
Patented May 3, 1955

2,707,768

GEOPHYSICAL EXPLORATION BY ELECTRICAL WELL LOGGING

John E. Owen, Tulsa, Okla., assignor to Geophysical Research Corporation, New York, N. Y., a corporation of New Jersey Application July 2, 1948, Serial No. 36,578

9 Claims. (Cl. 324—1)

This invention relates to geophysical exploration by electrical well logging.

The general principles of the electrical well logging art are explained in text books. Examples of such text books are current editions of "Field Geology" by Lahee and "Geophysical Prospecting for Oil" by Nettleton, both published by the McGraw-Hill Book Company, and "Geophysical Exploration" by Heiland, published by Prentice-Hall, Inc.

The prior art teachings sometimes do not provide electrical well logs that are free from confusion. This makes correlation of the logs difficult and sometimes very uncertain. For example, when a resistivity curve is recorded while logging earth formations of low resistivities, it conveys little information unless the resistivity recorder is set to record the curve with enough sensitivity to provide a curve form having adequate detail. But when this is done the sensitivity is so great that the recorder cannot record earth formations of high resistivities, when these are encountered, because the scale of the log is exceeded. Thus this practice, of attempting to log low-resistivity earth formations by setting the recorder to a high sensitivity, usually results in the recorded resistivity curve being a discontinuous line introducing confusion. Sometimes two resistivity curves are recorded on the log, one by a recorder adjusted to a low sensitivity, and the other by a recorder adjusted to a high sensitivity, but this practice puts a minimum of two resistivity curves on the log. The self-potential curve is normally recorded as a first curve, and usually two on-scale resistivity curves are required, with one obtained by an exploring electrode arrangement for locating the formation being logged, and the other by an electrode arrangement for providing better lateral current penetration. The described practice, therefore, may result in the log carrying five curves of which two are broken or segmental, these representing those obtained by the recorders set for high sensitivities in an effort to clarify the logging of the low-resistivity formations. Interpretation and correlation of such logs are time consuming and may involve confusion and uncertainty.

In some instances, the self-potential curve may be used to locate the interfaces of low-resistivity formations, but obviously the self-potential curve is relatively useless for this purpose when the self-potentials inherent in the drilling mud at such interfaces do not vary enough to provide the self-potential curve with good detail. Such conditions prevail in some instances, an example being shale layers. In such instances electrical well log interpretation and correlation may become uncertain in the absence of high-sensitivity resistivity curves, but when these are included the log may be confused by their segmental nature and the large total number of curves.

Another difficulty encountered, when using conventional electrode arrangements, is that the resistivity curves do not sharply record the location of earth formation interfaces by any single resistivity curve, while still providing good lateral penetration of the measuring current. This alone has led to the practice of recording two resistivity curves, each obtained from a different electrode arrangement, even when no attempt is made to cope with the problem encountered in connection with the logging of low-resistivity formations.

Due to these troubles, an electrical well log now frequently carries a maze of curves of which some are discontinuous, by being off-scale, and which are variously represented by solid lines of varying thicknesses and by various series of dashes and other combinations, in an effort to permit proper identification of the various curves. Normally, the recorder of each curve is an optical oscillograph which records by projecting a light beam to a mirror galvanometer for reflection to a traveling strip of photographic paper that must be relatively narrow for convenience in handling. This strip of photographic paper may be processed hastily, and this naturally means that the photographic processing is carried out in an manner unfavorable to the maximum resolution of which commercially available and suitable photographic paper is capable, which may not be too great in any event. These conditions are not favorable to clarity when a large number of curves are recorded, and particularly when it is necessary to record each curve in some manner permitting its individual identification.

An object of the present invention is to improve on this situation by providing an electrical well log carrying not more than two curves, in addition to the self-potential curve if it is included, which may be solid or continuous or unbroken lines which never exceed the scale used so as to leave the log strip, and which seldom and preferably never intercross, yet with theses two curves providing intelligible information and permitting easier log interpretation and correlation, regardless of whether the earth formations being logged are of high or low resistivities. Another object is to provide such a log with one or the other of the two curves, or both of them, indicating clearly and sharply the interfaces between formations of different resistivities, while still obtaining adequate lateral penetration of the measuring current. Other objects may be inferred.

The principles and use of the present invention are explained in connection with the following disclosure of a specific example of what is now contemplated as the best mode of applying and using these priniciples. The manner of making and constructiong the necessary equipment is free from complications to those skilled in the art, after the principles and use are understood.

Figure 2:
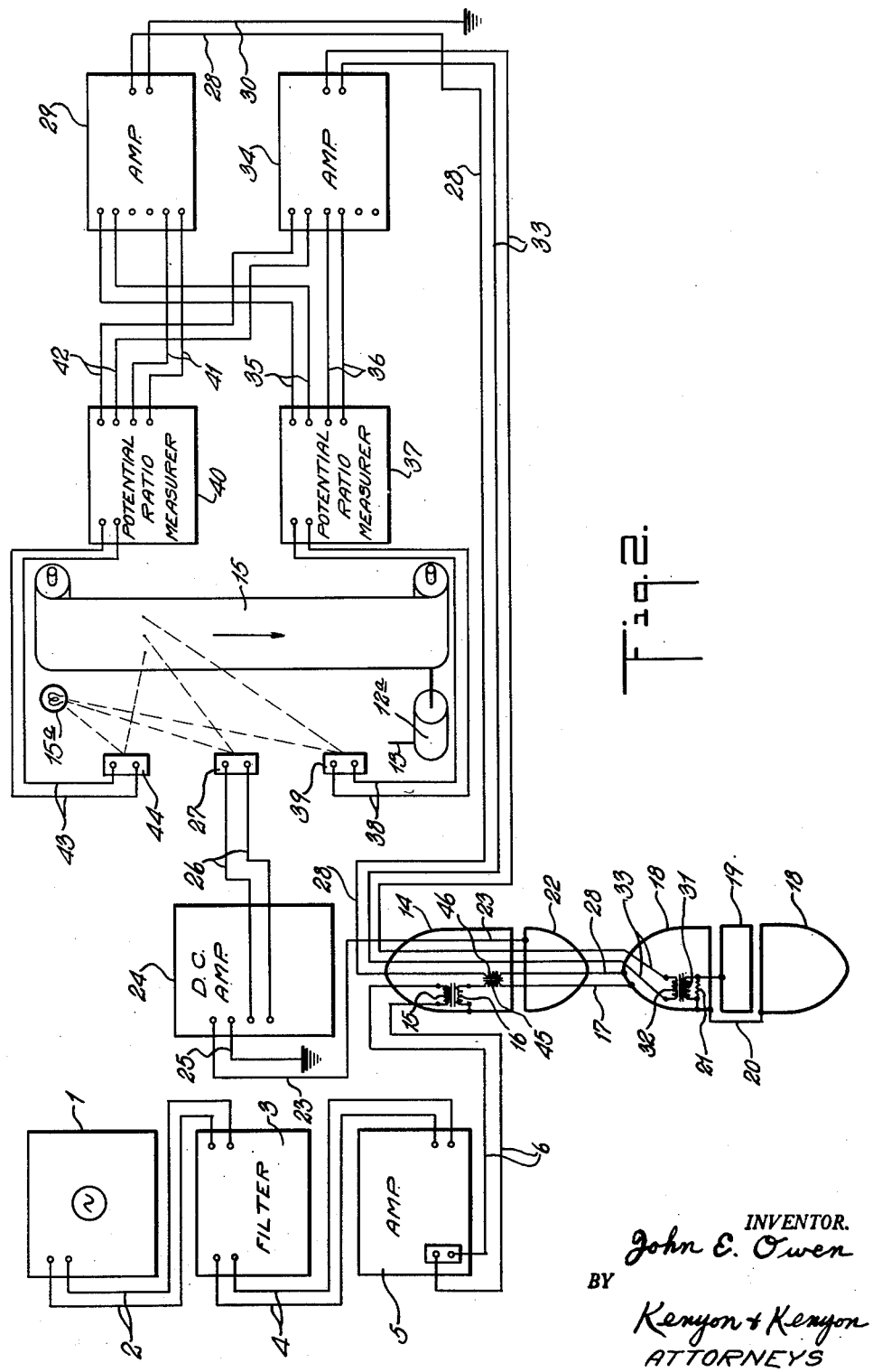
Figure 3:
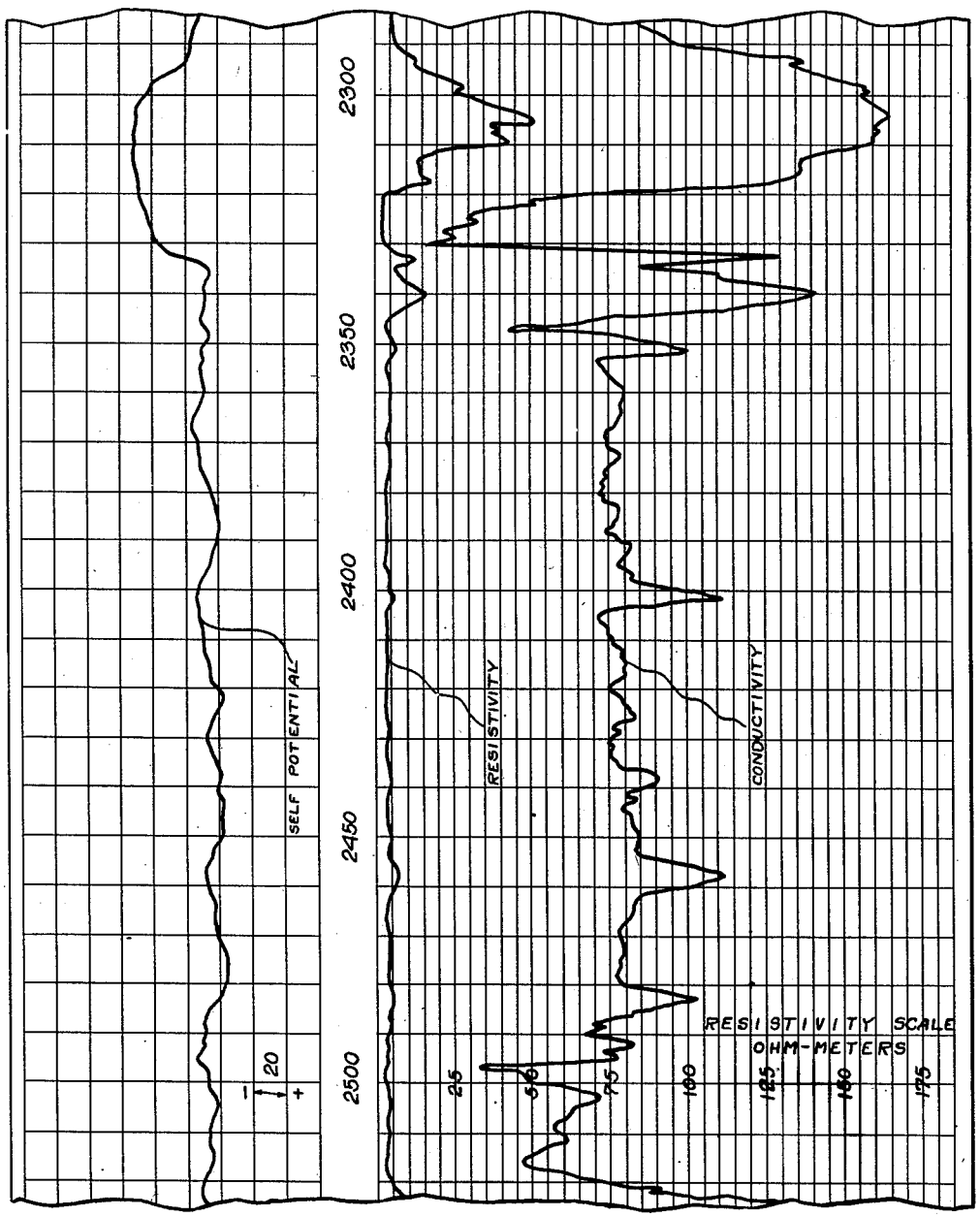

The accompanying drawings schematically illustrate this specific example of the invention, the various figures being as follows:

Fig. 1, a representation of a well being logged;

Fig. 2, a wiring diagram of the equipment used, the electrode assemblies being shown out of proportion to permit their inclusion, and;

Fig. 3, a segment of the log obtained by this invention.

In these drawings, a source of electric 50 cycle per second alternating current is indicated at 1. This may be an electronic oscillator powering solenoids driving a tuning fork having a natural vibration period of 50 cycles per second and with its prongs magnetized and functioning as armatures adjacent a field coil providing the oscillator's output. This output is carried, by conductors 2, through any suitable electronic filter 3 designed to pass only 50 cycle A. C. current of good wave form, and from it, by conductors 4, to the input of a good electronic power amplifier 5 providing an output at a potential of 100 volts without material wave form distortion. This has been found adequate potential, but may be varied as required. The A. C. frequency may also be varied, but it should preferably be low and distinct from the frequencies of possible electrical interference, and it may be provided by sources other than that suggested.

Simplification of this description is obtained by explaining, now, that the electrical powering equipment, and all other electrical equipment including measuring instruments and log recorders, may be housed in the instrument room of any conventional electrical well logging type of automobile truck. Such a truck provides a powered rotary drum carrying the multiple-conductor electric cable by which the electrode arrangement is manipulated in the well. This cable is usually metal armored or sheathed, and it contains a large number of individually electrically insulated electric conductors providing for the necessary electric circuits and, usually, spares which may be used when necessary. The drum has all the operating cable conductors, at its end, electrically working through individual slip rings and collectors to permit drum rotation while maintaining electrical connections for the various circuits. Since all of these arrangements are conventional, they are not illustrated in detail. When any single conductor is specified and numeraled, it is to be understood as including the standing conductors on the truck, the drum slip rings and collectors, the running conductors of the multiple-conductor cable, and internal electrode-assembly conductors, whenever they are required to meet practical well-logging operating conditions. When described as an insulated conductor, the meaning is that it is electrically insulated throughout its length from the drilling mud or other current leakage paths. The multiple conductor cable must be mechanically strong enough to support its own weight and that of all electrode assemblies suspended thereby in the well, and it must be long enough to reach to the bottom of the deepest well portion to be explored. Thus, the multiple-conductor cable may be from 10,000 to 15,000, or more, feet long.

Continuing, the output from the amplifier 5 is carried down into the well by two insulated conductors 6. In Fig. 1, the instrument room is indicated at 7, while 8 indicates the powered cable drum, 9 the armored outside of the multiple-conductor running cable, 10 the usual sheave directing this cable, from the drum, down the well, and 11 the well itself. The drawings' scale permits only a segmental showing of the well, but it may be 15,000, or more, feet deep. The conductors of the multiple-conductor cable, go from the drum's slip rings, indicated at 9a, through the conductors of a standing multiple-conductor cable 9b and into the instrument room 7. This standing cable section 9b may be metal sheathed for electrical reasons. As explained hereinabove, it suffices to refer simply to the conductors 6 as though they were continuous, a practice repeated in other instances hereinafter.

The sheave 10 is shown as being mechanically connected to drive a Selsyn transmitter 12 connected, by a multiple-conductor cable 13 providing the necessary conductors, with a Selsyn receiver 12a arranged to drive the strip of photographic paper 15 which is used to provide the log, inside the instrument room 7. This provides for moving the log strip synchronously with the travel of the cable 9, whereby to locate the electrode positions in the well where the measuring is done.

The lower end of the cable 9 mechanically suspends a ground electrode assembly 14, in the form of an elongated metal tube which functions both as a grounding electrode, through its metallic outside, and as a fluid-tight container for an electric step-down transformer having its primary 15 connected with the two insulated conductors 6 connecting with the output of the amplifier 5. The multiple conductor cable may have its metal armor or sheath 9 electrically connected with the metallic outside of the ground electrode assembly 14. The secondary 16, of this transformer, has one end electrically connected with the metal outside of the ground electrode 14, and its other end connected to an insulated conductor 17 which is of large diameter to carry the lower potential current and extends below the ground electrode assembly and with which a guarded exploring or measuring electrode assembly, described below, is connected. The secondary reduces the potential to the value used by the electrodes, which may be about 1 volt. But the conductors 6 may be adequately small in diameter for inclusion by the multiple-conductor cable, yet carry adequate power down into the well, since they carry the higher-potential current.

This guarded electrode assembly includes upper and lower elongated guard electrodes 18 and an interposed and relatively very short exploring or measuring electrode 19. The elongated guard electrodes 18 are electrically interconnected by an insulated conductor 20, and one of them is electrically interconnected with the exploring or measuring electrode 19 by a very low impedance, illustrated in Fig. 2 as a ¼ ohm resistor 21. This resistor may be housed inside the assembly. The conductors 17 and 20 should be made to have as little impedance as is structurally possible, but the conductor 17 must be long enough to suspend the guarded electrode assembly 18—19 below the ground electrode assembly 14 far enough to prevent the electrical grounding field, of the latter, from interfering with the electrical field of the exploring or measuring electrode 19. The two electrode assemblies may be structurally combined as a rigid assembly, if desired, but handling may be facilitated if the insulated conductor 17 is made in the form of a suspending cable, due to its flexibility.

The lower end of the ground electrode assembly 14 is shown as including a short self-potential measuring electrode 22 which is connected through one of the insulated conductors 23, of the multiple conductor cable 9, through the slip rings of the drum 8 etc., to the input of a D. C. electronic amplifier 24, to which is also connected a grounded conductor 25. This conductor 25 may be grounded by connection with the cable armor, or by the use of an electrode driven in the earth. The output of this D. C. amplifier 24 connects, through conductors 26, with the mirror galvanometer 27 for recording the self-potential curve. Although this curve may not be needed as much as it is in the case of prior art logging procedures, it is considered desirable to record it in its familiar position.

An insulated conductor 28 extends upwardly from the guarded electrode assembly, where it is in direct electrical connection with the guard electrodes 18, to one of the input terminals of an A. C. electronic amplifier 29. The other input terminal, of this amplifier 29, is grounded by a conductor 30. This conductor 30 may be grounded by connection with the cable armor, or by using a grounding electrode driven into the earth. The output of the amplifier 29 provides an amplified potential indicative of the potential of the elongated guard electrodes 18 and also the exploring or measuring electrode 19, the latter having substantially the same potential as the guard electrodes due to the very low impedance of its connection with them.

The elongated guard electrodes 18 may also be in the form of metal tubes so they can function both as electrodes and as fluid-tight containers for equipment. The upper one of the guard electrodes 18 is indicated as housing the low resistance resistor 21, and also a transformer of which the primary 31 is arranged in shunt connection with the resistor 21 so it is connected therewith for electrical energization thereby. The output of the secondary 32, of this transformer, is carried by insulated conductors 33 up to another A. C. electronic amplifier 34. The output of this amplifier 34 represents a potential that is responsive to the amount of current flowing through the exploring or measuring electrode 19.

Since the current is A. C., it is possible to substitute other forms of impedances for the resistor 21 used to interconnect the guard electrodes 18 with the exploring or measuring electrode 19. For example, the resistor 21 could be eliminated and the inductive impedance of the transformer primary 31 relied upon. It would also be possible to substitute a condenser for the resistor 21. The transformer having the primary 31 and the secondary 32 is a step-up transformer for the purpose of raising the potential to a higher level in order to override crosstalk from other conductors in the cable and possible interference from extraneous electrical disturbances. If this result is not considered necessary this transformer might be eliminated, in which case the conductors would be in shunt connection with the impedance used for energization by the potential drop resulting from the impedance. However, the designing problems are simplified by using the resistor 21 in the manner indicated, and its use is therefore deemed preferable.

Both the electronic A. C. amplifiers 29 and 34 may include filters which pass the frequency of the exciting current used but exclude extraneous disturbances such as 60 cycle interference from nearby power transmission lines. These amplifiers should have gain controls in each instance. By connecting their outputs by conductors 35 and 36, respectively, with an instrument for measuring and graphically recording the direct ratio between the potential put out by the amplifier 29 and the potential put out by the amplifier 34, a resistivity curve may be obtained representing the apparent resistivities of the formations traversed by the exploring or measuring electrode 19. Such an instrument is provided by connecting the conductors 35 and 36 with the terminal sets for the two input circuits of a device 37 for measuring the ratio between two A. C. current potentials. Such a device may be made as disclosed and claimed by the J. E. Owen Patent 2,419,852 which issued April 29, 1947. The complete instrument may then be provided by connecting the output terminals of this device 37, by conductors 38, with the mirror galvanometer 39 of an optical oscillograph.

It is to be understood that the mirror galvanometers 27 and 39 may both be mounted to project light beams from a light source 15a to the traveling strip 15 of photographic paper, both the galvanometers 27 and 39 recording on the same strip to provide the self potential and resistivity curves when the strip is photographically processed. Any suitable oscillograph arrangement may be used.

However, as previously explained, if the instrument's sensitivity is increased to make the resistivity curve record detail when the exploring electrode 19 is traversing earth formations of low resistivities, then when high resistivity formations are traversed, the light beam tracing the resistivity curve is thrown completely off the strip of photographic paper 15. This leads to confused results, as previously explained.

According to the present invention, a second device 40 is provided, which may be a duplicate of the device 37. The amplifiers 29 and 34 may be of the ordinary commercial type providing a plurality of output circuits. Therefore, these amplifiers are shown with separate sets of output terminals with conductors 41 connecting a second set of output terminals of the amplifier 29 with one of the input terminal sets of the device 40, and with conductors 42 connecting the second set of output terminals of the amplifier 34 with the other input terminal set of the device 40. Furthermore, the output of this device 40 is connected by conductors 43 with a third mirror galvanometer 44 which also receives light from the light source 15a and reflects it onto the photographic paper strip 15 to record a third curve. However, in this instance, the conductors 41 and 42 are connected with the device 40, which works exactly like the patented device 37, in the reverse order of the connections of the conductors 35 and 36 with the other device 37. Therefore, the output of the device 40 going through the conductors 43, for ultimate recording on the log, represents the inverse ratio between the potential at the guarded electrode assembly, and the amount of current passing through the exploring or measuring electrode 19. In other words, an apparent conductivity curve is recorded.

Furthermore, according to the invention, the mirror galvanometers 39 and 44 are set up, or arranged, to record the resistivity and conductivity curves on the same log strip 15, with the curves side-by-side and in the same order of well depth, and with laterally spaced parallel base lines, and so the curves curve towards each other with increasing values of resistivity and conductivity, respectively. When logging a well, the described instruments are adjusted, in sensitivity, so that the apparent resistivity curve is recorded on a scale keeping the curve on the log while recording the highest resistivity values encountered, and so that the apparent conductivity curve is also recorded on a scale keeping the curve on the log while recording the highest conductivity values encountered. The sensitivities may be adjusted to keep the curves from ever intersecting, except, perhaps, while recording unexpected or abnormal values.

Fig. 3, showing the log obtained by the present invention, represents a short portion of a log actually obtained in practicing the invention. The depth lines are recorded in the usual fashion during the logging, so as to provide a record of where the measurements are obtained. This is done so the location of the electrode location at the instance each electrical value is recorded, is also recorded.

This Fig. 3, shows that between about 2,300 and 2,350 feet formations were traversed, by the guarded exploring electrode assembly, of varying resistivities, and the self-potential curve also shows evidence of a variation of the self-potentials, but the conductivity curve is replete with extreme detail in portions where the other curves show no detail at all. Thus, even in such instances the conductivity curve has considerable value. From about 2,350, up to and slightly above 2,500 feet, neither the resistivity or self-potential curve shows much detail at all, the resistivity curve being utterly lacking in detail in many instances, since it is running so close to its base line that the recording instrument is relatively non-responsive. But throughout this entire region the conductivity curve shows considerable detail and is well adapted for correlation purposes. Since only three curves are recorded in all, there is no confusion. It is unnecessary to use any arrangement for identifying the various curves. Neither the conductivity nor resistivity curves cross each other, due to their being recorded in the manner previously described.

This invention provides a method for facilitating correlation of electrical well logs obtained from a plurality of wells drilled through earth formations of relatively high and low resistivities with the formations of low resistivities providing little or no variations in the self-potentials in drilling mud adjacent to them. This method comprises electrically logging a plurality of the wells, as by the apparatus and method described, whereby to record on each of the respective logs a curve of the apparent resistivity of the formations, on a scale keeping the curve on the log while recording the highest resistivities encountered. Simultaneously with this, there is also recorded, on each of the respective logs, the apparent conductivities of the formations, on a scale keeping this curve on the log while recording the highest conductivity values encountered. These curves should be logged with the recorders set for a reasonably high sensitivity, and preferably at the maximums permitting on-scale recording at all times. The resistivity and conductivity curves on each log should be obtained from the same well, and they should be recorded side-by-side in the same order of well depth, and with laterally spaced parallel base lines, and curving toward each other with increasing values of resistivity and conductivity respectively. Preferably the laterally spaced base lines, of the two curves, are arranged to leave room for a self-potential curve as previously described.

As previously indicated, the down-the-hole transformer, having the primary 15 and secondary 16, is a step-down transformer so that relatively high potential may be carried by the conductors 6, whereby they may carry the required power without being of excessively large size and while being long enough to reach down to the bottoms of the deepest wells to be logged. The low potential current, from the secondary 16, requires the conductor 17 to be very large so it may carry enough of the low potential current to power the guarded electrode assembly.

Although the exploring or measuring electrode 19 may be only about 3 inches long, so that its length will not exceed the average minimum thicknesses of the earth formations to be logged, the guard electrodes 18 may be about 10 feet long each, the assembly therefore using considerable power.

These guard electrodes are used to greatly elongate the electrically energized earth field surrounding the exploring or measuring electrode 19, whereby the field measured by the latter is restricted to a very thin, flat, horizontal disk, in effect. Therefore, the electrode 19 is affected only by earth formations within this very thin flat field, and this flat field is caused to laterally penetrate the earth formations far enough to reach through the so-called invaded zone, which is the material immediately surrounding the drill hole into which fluid used to drill the well has penetrated.

This idea of using elongated guard electrodes both above and below the exploring and measuring electrode, and simultaneously moving all of the electrodes together with them all provided with substantially the same potential and polarity but with the measuring electrode, only, used in making the log, was disclosed and claimed in the J. E. Owen patent applications filed July 26, 1940, Serial Number 347,682, now abandoned, and November 27, 1943, bearing Serial Number 511,943, now Patent No. 2,446,303, the latter being a continuation-in-part of the former and the present application being a continuation-in-part of the latter. In the earliest application, the exploring electrode was disclosed as being completely insulated from the guard electrodes, and supplied with current from a source independent from the source supplying the guard electrodes, together with a variable resistance, in the guard electrode powering circuit, so that all the electrodes could be provided with exactly the same potential. In the application bearing Serial Number 511,943 the electrodes were disclosed as provided with only a single source of power, using the down-the-hole transformer, and with the guard electrodes interconnected with the exploring or measuring electrode by a low impedance resistor, much as has been disclosed, so far, in the present instance.

It has been found that due to the heavy current carried by the conductor 17 and its necessary proximity to the conductor 28 used to measure the potential applied the guard electrode assembly, that the two circuits, including these conductors, are inductively coupled so as to introduce a false potential in the conductor 28, which interferes with the logging accuracy. In the present instance, this difficulty is avoided by inductively interconnecting the conductors 17 and 28 by a transformer, the conductor 17 including the primary 46 of this transformer in its circuit, and the conductor 28 including its secondary 47 in its circuit. With the primary and secondary arranged so the current thus induced in the conductor 28, bucks the current caused by the inductive coupling resulting from the proximity of the conductors 17 and 28, the two induced potentials may be made to almost completely cancel out. It follows that inaccuracies resulting from the accidental inductive coupling may thus be reduced until the inaccuracy is so small that it has no practical effect. This arrangement is of advantage even when a conductivity curve is not recorded.

It has been mentioned that the grounding electrode 14 should be remote from the guarded electrode assembly, and in this connection a 25 foot separation has been found satisfactory. The conductor 17 has room permitting it to be of large cross section so its impedance may be kept very low. This grounding electrode 14 in one form of this invention was cylindrical and about 3 inches in diameter, and about 20 feet long, and the guarded electrode assembly was cylindrical throughout, above 3 inches in diameter and about twenty feet long, including a three inch long exploring or measuring electrode plus small lengths of electrical insulation separating it from the other electrodes. As previously indicated, the grounding electrode assembly and the guard electrode assembly may be one rigid length, although this is cumbersome and, therefore, may make it preferable to interconnect the assemblies by flexible cables providing the various conductors.

It is to be understood that any well to be logged must be uncased and filled with an electrically conductive fluid, usually provided by the drilling mud. It is considered preferable to run the cable 9 off the drum 8, after the two electrode assemblies are inserted in the well, until the bottom of the exploration zone is reached, and then to make the log while the electrode assemblies are raised by winding up the cable by the powered drum. The setting of the various instruments as required by the present invention has already been described.

The particular electrode arrangement disclosed herein has the great advantage of measuring only the resistivities and conductivities of the formations radially opposite the exploring or measuring electrode which may be made with a length not exceeding the expected average minimum thicknesses of the formations pierced by the well being logged. When the measuring sharpness, thus provided, is not considered necessary, other electrode arrangements may be used while logging the resistivity and conductivity curves in the manner disclosed herein. In all events, the inclusion of the conductivity curve provides a means for correlating formations under circumstances where the use of resistivity curves results in considerable confusion, as exemplified by the logging of earth formations which are of low resistivity and which also fail to provide self-potential differences to any material degree.

I claim:

1. A method for facilitating correlation of electrical well logs obtained from a plurality of wells drilled through earth formations of relatively high and low electrical resistivities with the formations of low resistivities providing little or no variations in the self-potentials in drilling mud adjacent thereto, said method comprising electrically logging a plurality of said wells and recording on each of the respective logs a curve of the apparent resistivities of said formations on a scale keeping the curve on the log while recording the highest resistivity values encountered, and also recording on each of the respective logs the apparent conductivities of said formations on a scale keeping the curve on the log while recording the highest conductivity values encountered, with said resistivity and conductivity curves on each log being obtained from the same well and recorded side-by-side in the same order of well depth and with laterally spaced parallel base lines and curving towards each other with increased values of resistivity and conductivity respectively.

2. A method as defined by claim 1 and with said logging done in each instance by using a single short exploring electrode connected in an electrically powered electric circuit including the earth formations adjacent thereto and moved in the well to traverse said formations, simultaneously moving with said exploring electrode relatively elongated guard electrodes adjacently positioned both above and below it and which are also connected in an electrically powered electric circuit including the earth formations adjacent thereto, applying an electric potential to said guard electrodes of the same polarity and of approximately equal value as that applied by the first-named circuit to said exploring electrode, measuring the electric potentials of said electrodes and the amounts of the electric current flowing through said exploring electrode, and graphically logging both the direct and inverse ratios of the potential to the current flow measurements obtained, to provide said resistivity and conductivity curves respectively.

3. A method for facilitating correlation of electrical well logs obtained from a plurality of wells drilled through earth formations of relatively high and low electrical resistivities with the formations of low resistivities providing little or no variations in the self-potentials in drilling mud adjacent thereto, said method comprising electrically logging a plurality of said wells and recording on each of the respective logs a curve of the apparent resistivities of said formations on a scale keeping the curve on the log while recording the highest resistivity values encountered, and also recording on each of the respective logs the apparent conductivities of said formations on a scale keeping the curve on the log while recording the highest conductivity values encountered, with said resistivity and conductivity curves on each log being obtained from the same well and recorded side-by-side in the same order of well depth and with laterally spaced parallel base lines.

4. A method as defined by claim 3 and with said logging done in each instance by using a single short exploring electrode connected in an electrically powered electric circuit including the earth formations adjacent thereto and moved in the well to traverse said formations, while simultaneously moving with said exploring electrode relatively elongated guard electrodes adjacently positioned both above and below it and which are also connected in an electrically powered electric circuit including the earth formations adjacent thereto and while applying an electric potential to said guard electrodes of the same polarity and of approximately equal value as that applied by the first-named circuit to said exploring electrode, and while measuring the electric potentials of said electrodes and the amounts of the electric current flowing through said exploring electrode, and graphically logging both the direct and inverse ratios of the potential to the current flow measurements obtained, to provide said resistivity and conductivity curves respectively.

5. A method for facilitating correlation of electrical well logs obtained from a plurality of wells drilled through earth formations of relatively high and low electrical resistivities with the formations of low resistivities providing little or no variations in the self-potentials in drilling mud adjacent thereto, said method comprising electrically logging a plurality of said wells and recording on each of the respective logs a curve of the apparent resistivities of said formations on a scale keeping the curve on the log while recording the highest resistivity values encountered, and also recording on each of the respective logs the apparent conductivities of said formations on a scale keeping the curve on the leg while recording the highest conductivity values encountered, with said resistivity and conductivity curves on each log being simultaneously obtained from the same well and simultaneously recorded side-by-side in the same order of well depth and with laterally spaced parallel base lines.

6. A method as defined by claim 5 and with said logging done in each instance by using a single short exploring electrode connected in an electrically powered electric circuit including the earth formations adjacent thereto and moved in the well to traverse said formations, while simultaneously moving with said exploring electrode relatively elongated guard electrodes adjacently positioned both above and below it and which are also connected in an electrically powered electric circuit including the earth formations adjacent thereto and while applying an electric potential to said guard electrodes of the same polarity and of approximately equal value as that applied by the first-named circuit to said exploring electrode, and while measuring the electric potentials of said electrodes and the amounts of the electric current flowing through said exploring electrode, and graphically logging both the direct and inverse ratios of the potential to the current flow measurements obtained, to provide said resistivity and conductivity curves respectively.

7. A method for facilitating correlation of electrical well logs obtained from a plurality of wells drilled through earth formations of relatively high and low electrical resistivities with the formations of low resistivities providing little or no variations in the self-potentials in drilling mud adjacent thereto, said method comprising electrically logging a plurality of said wells and recording on each of the respective logs a curve of the apparent resistivities of said formations and also recording on each of the respective logs the apparent conductivities of said formations, with said resistivity and conductivity curves on each log being simultaneously obtained from the same well and simultaneously recorded side-by-side in the same order of well depth and with laterally spaced parallel base lines.

8. A method for facilitating the electrical logging of a well drilled through earth formations of relatively high and low resistivities with the formations of low resistivity providing little or no varations in the self-potentials in drilling mud adjacent thereto, said method comprising electrically logging the well and recording on the log a curve of the apparent resistivities of said formations on a scale keeping the curve on the log while recording the highest resistivity values encountered, and also recording on the log the apparent conductivities of said formations on a scale keeping the curve on the log while recording the highest conductivity values encountered, said resistivity and conductivity curves on said log being simultaneously obtained and simultaneously recorded side-by-side in the same order of well depth and with laterally spaced parallel base lines.

9. A method as defined by claim 8 and with said logging done by using a single short exploring electrode connected in an electrically powered electric circuit including the earth formations adjacent thereto and moved in the well to traverse said formations, while simultaneously moving with said exploring electrode relatively elongated guard electrodes adjacently positioned both above and below said exploring electrode and which are also connected in an electrically powered circuit including the earth formations adjacent thereto and while applying an electric potential to said guard electrodes of the same polarity and of approximately equal value as that applied by the first-named circuit to said exploring electrode, and while measuring the electric potentials of said electrodes and the amount of current flowing through said exploring electrode, and graphically logging both the direct and inverse ratios of the potential to the current flow measurements obtained, to provide said resistivity and conductivity curves respectively.

References Cited in the file of this patent

UNITED STATES PATENTS

| Number | Name | Date |
|---|---|---|
| 2,036,193 | Boyd | Apr. 7, 1936 |
| 2,191,120 | Slichter | Feb. 20, 1940 |
| 2,206,891 | Hawley | July 9, 1940 |
| 2,246,460 | Bozzoni et al. | June 17, 1941 |
| 2,251,817 | Athey et al. | Aug. 5, 1941 |
| 2,401,371 | Pearson et al. | June 4, 1946 |
| 2,446,303 | Owen | Aug. 3, 1948 |
| 2,605,321 | Owen | July 29, 1952 |

OTHER REFERENCES

Text—Geophysical Exploration by Heiland—Prentice-Hall Inc., October 1946, page 728. See lines at middle of page relative to resistivity and conductivity diagrams.